Patented Feb. 3, 1931

1,790,887

UNITED STATES PATENT OFFICE

LYNNE H. ULICH, OF RACINE, WISCONSIN, ASSIGNOR, BY MESNE ASSIGNMENTS, TO NEWPORT CHEMICAL CORPORATION, A CORPORATION OF DELAWARE

PROCESS OF PREPARING INDANTHRONE DYESTUFFS

No Drawing.  Application filed July 2, 1928. Serial No. 290,045.

This invention relates to an improved method for the preparation of indanthrone coloring matters and has for its object to provide a method of obtaining indanthrone bodies in a high state of purity, especially with respect to those impurities normally present in the dyestuffs prepared directly from amino anthraquinones.

N-dihydro-1,2,2′,1′-anthraquinone azine as prepared directly from amino anthraquinones contains certain objectionable impurities tending to produce undesirable dyeing properties in the final dyestuff. These impurities can be removed to some extent by methods of purification, such as by recrystallizing and the like. A recent method of preparing these dyestuffs practically free of the impurities is described in U. S. Patent No. 1,634,473, and consists in dehalogenating a halogenated indanthrone body.

I have now found that the dehalogenation of the halogenated indanthrones can be carried out in a more economical manner, with the obtaining of higher yields and a final dyestuff possessing clearer and brighter shades. It appears that during the steps of isolating and dehalogenating certain objectionable impurities are removed by my present process which could not be so economically removed by previously described methods.

My improved process of dehalogenation comprises the prolonged treatment at an elevated temperature of a halogenated indanthrone body, such as halogenated N-dihydro-1,2,2′,1′-anthraquinone azine, with an aromatic amine such as aniline, para toluidine, alpha naphthylamine, alpha amino anthraquinone and the like, together with an assisting agent such as sodium acetate, and together with copper or a copper salt, as for example, basic copper acetate. Preferably, a primary aromatic amine is employed. Any amine remaining after the reaction has taken place may be removed by known methods, as by dissolving out with alcohol or dilute mineral acid, or by direct filtration or steam distillation. The inorganic matter may likewise be removed with water by settling and decanting, followed by washing with water. After filtering and drying the products, they are obtained in the form of bluish powders generally having a decided metallic luster.

The reaction may be caused to go to completion, that is, until practically all the halogen has been replaced, or if desired, may be stopped at a point at which the halogen groups are not completely replaced. In the latter instance according to known facts, the products containing larger amounts of halogen will possess a greener hue.

The dyestuffs in this group are in the pure form dark blue powders possessing generally a bronzy lustre. The shades of the various dyestuffs may be varied to a limited extent from reddish blue shades to greenish blue shades depending upon the extent to which the halogen has been replaced. These dyestuffs are readily soluble in concentrated sulfuric acid, imparting thereto an olive brown coloration, and may be precipitated therefrom in the form of bluish flakes by diluting the solution with water. They are practically insoluble in water, alcohol and benzene sparingly soluble in aniline and nitrobenzene; and readily soluble in alkaline hydrosulfite solution with a bluish coloration, from which cotton is dyed a blue shade changing to brilliant blue after treatment with suitable oxidizing agents.

Without limiting my invention to any particular procedure, the following examples in which parts by weight are given, will serve to illustrate my method in its preferred form.

Example 1

Suspend 10 parts of 3,3′-dichloro-N-dihydro-1,2,2′,1′-anthraquinone azine in the form of a finely divided paste in 100 parts of aniline. Heat to 160° C. and hold at this temperature for 6 hours. Cool to 100° C. and add 5 parts of dry basic copper acetate (finely powdered) and 5 parts of fused sodium acetate (finely powdered). Now heat to a gentle reflux and maintain such a temperature as to give a gentle reflux for 30 hours. Cool to 100° C. Filter and wash with alcohol until free of aniline. Then wash with 1% ammonia water and finally with hot water until free of inorganic salts. Upon drying and grinding, the product is obtained as a bluish powder with a metallic lustre, which dyes cotton bluish shades from an alkaline hydrosulfite bath changing to brilliant blue after treatment with suitable oxidizing agents. The product is practically free of organic chlorine, that is chlorine combined with the indanthrone body as distinguished from chlorine that may be present as an impurity in the form of various inorganic chlorides.

*Example 2*

Suspend 10 parts of finely ground, dry chloro-N-dihydro-1,2,2′,1′-anthraquinone azine containing about 14% of organic chlorine, prepared by the chlorination of indanthrone in 100 parts of aniline. Proceed as in Example 1. The product obtained is similar to the product obtained in Example 1.

*Example 3*

Suspend 10 parts of dry finely powdered 3,3′-dichloro-1,2,2′,1′-anthraquinone azine in 100 parts of dry aniline. Add 5 parts of dry finely powdered basic copper acetate and 5 parts of finely powdered fused sodium acetate. Heat to reflux for about 8 hours. Work up the mass as in Example 1. The product obtained is somewhat similar to the product obtained in Example 1 except that it contains more organic chlorine and produces blue shades on cotton somewhat greener than in Example 1.

*Example 4*

Suspend 10 parts of finely powdered dry chloro-N-dihydro-1,2,2′,1′-anthraquinone azine as used in Example 2 above in 100 parts of dry alpha naphthylamine. Add 5 parts of finely powdered dry basic copper acetate and 5 parts of fused finely powdered sodium acetate. Heat to 180–190° C. and hold at this temperature for about 30 hours. Cool to 100° C. and add 300 parts of solvent naphtha. Filter and wash free of alpha naphthylamine with solvent naphtha. Now wash with alcohol etc. as in Example 1.

*Example 5*

Suspend 10 parts of chloro-N-dihydro-1,2,2′,1′-anthraquinone azine as used in Example 2 in 100 parts of naphthalene at 100° C. Now add 20 parts of alpha amino anthraquinone and 5 parts each of finely ground dry basic copper acetate and finely ground fused sodium acetate. Heat to reflux for 30 hours. Cool to 100° C. and add 300 parts of nitro benzol. Filter and wash free of alpha amino anthraquinone with nitro-benzol. Wash with alcohol, ammonia and water as in Example 1. The dyestuff obtained is somewhat similar to that obtained in Example 1.

*Example 6*

Suspend 10 parts of 3,3′-dibromo-N-dihydro-1,2,2′,1′-anthraquinone azine containing about 26% of organic bromine, in 100 parts of aniline. Proceed as in Example 1. The dyestuff obtained is similar to the dyestuff obtained in Example 1.

*Example 7*

Suspend 10 parts of trichloro-N-dihydro-1,2,2′,1′-anthraquinone azine, containing about 20% combined chlorine, in 100 parts of dry aniline. The remaining procedure is as in Example 2. The product obtained is somewhat similar to the product obtained in Example 2.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing an indanthrone body, which comprises treating a halogenated indanthrone body at an elevated temperature with an aromatic amine in the presence of a copper body, thereby effecting elimination of halogen.

2. The process of preparing an indanthrone body, which comprises treating a halogenated indanthrone body at an elevated temperature with an aromatic amine in the presence of basic copper acetate, thereby effecting elimination of halogen.

3. The process of preparing an indanthrone body, which comprises heating a halogenated indanthrone body with an aromatic amine, basic copper acetate and sodium acetate.

4. The process of preparing an indanthrone body, which comprises dehalogenizing a halogenated indanthrone body by treatment at an elevated temperature with an aromatic primary amine and a copper body.

5. The process of preparing an indanthrone body, which comprises dehalogenizing 3,3′-dihalogen 1,2,2′,1′-anthraquinone azine by treatment at an elevated temperature with an aromatic primary amine and a copper body.

6. The process of preparing an indanthrone body, which comprises dehalogenizing a halogenated indanthrone body by treatment at an elevated temperature with an aromatic primary amine and basic copper acetate.

7. The process of preparing an indanthrone body, which comprises heating a halogenated indanthrone body with an aromatic primary amine in the presence of basic copper acetate and sodium acetate, cooling, washing the mass free of the aromatic primary amine and recovering the indanthrone body.

8. The process of preparing an indanthrone body, which comprises heating a halogenated indanthrone body with aniline in the presence of basic copper acetate and sodium acetate, cooling, washing the mass free of aniline and recovering the indanthrone body.

9. The process of preparing an indanthrone body, which comprises heating 3,3'-dihalogen-N-dihydro-1,2,2',1'-anthraquinone azine with an aromatic primary amine in the presence of basic copper acetate, cooling, washing the mass free of the aromatic primary amine and recovering the indanthrone body.

10. The process of preparing an indanthrone body, which comprises heating 3,3'-dihalogen-N-dihydro-1,2,2',1'-anthraquinone azine with aniline in the presence of basic copper acetate, cooling, washing the mass free of aniline and recovering the indanthrone body.

11. The process of preparing an indanthrone body, which comprises treating a halogenated indanthrone body at a temperature of 160–180° C. with an aromatic amine in the presence of a copper body, thereby effecting elimination of halogen.

12. The process of preparing an indanthone body, which comprises heating 3,3'-dihalogen-N-dihydro-1,2,2',1'-anthraquinone azine with aniline in the presence of basic copper acetate to a temperature of 160–180° C., cooling, washing the mass free of aniline and recovering the indanthrone body.

13. A process as in claim 11, wherein the heating is carried on for approximately 30 hours.

14. A process as defined in claim 12, wherein the heating is carried on for approximately 30 hours.

In testimony whereof I have hereunto subscribed my name at Carrollville, Milwaukee County, Wis.

LYNNE H. ULICH.